United States Patent [19]

Dellande et al.

[11] 4,435,824

[45] Mar. 6, 1984

[54] COMMUNICATION SYSTEM HAVING IMPROVED DIFFERENTIAL PHASE SHIFT KEYING MODULATION

[75] Inventors: Brian W. Dellande, Austin; Henry Wurzburg, Round Rock, both of Tex.

[73] Assignee: Motorola, Inc., Schaumburg, Ill.

[21] Appl. No.: 380,322

[22] Filed: May 20, 1982

[51] Int. Cl.³ .................. H04L 27/10; H04L 27/18
[52] U.S. Cl. ........................ 375/46; 375/48; 375/56
[58] Field of Search .............. 375/9, 44, 46, 49, 56; 328/14

[56] References Cited

U.S. PATENT DOCUMENTS 3,665,103 5/1972 Watkins .................. 375/49
4,339,724 7/1982 Feher .................... 328/14

Primary Examiner—Benedict V. Safourek
Assistant Examiner—Frank M. Scutch, III
Attorney, Agent, or Firm—Anthony J. Sarli, Jr.; Jeffrey Van Myers; Robert L. King

[57] ABSTRACT

A communication system which generates an output signal of a selected primary frequency having digital data bits serially modulated thereon by utilizing a hybrid differential phase shift keyed (DPSK) modulation is provided. The improved DPSK modulation is frequency modulation of a phase encoded signal. A controller controls frequency generator means which frequency shift the output signal between primary and secondary frequencies. The controller and frequency generator means provide a modulated output signal which is D.C. balanced bit by bit and has substantially reduced harmonic energy.

9 Claims, 8 Drawing Figures

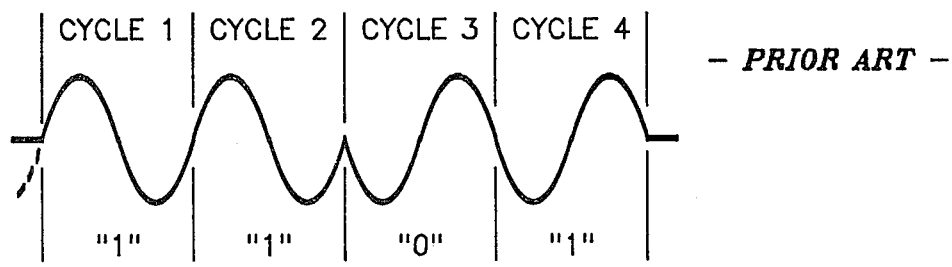
*FIG. 1* — PRIOR ART —
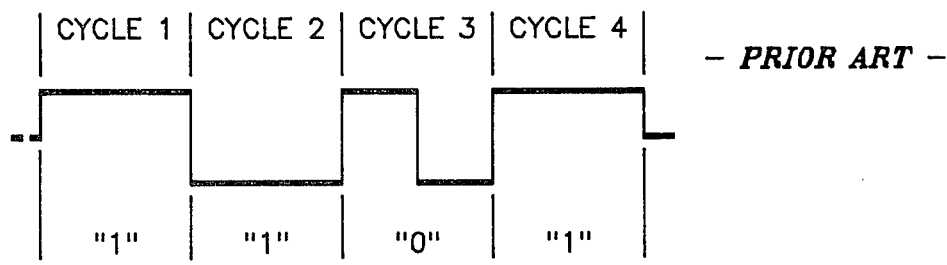
*FIG. 2* — PRIOR ART —
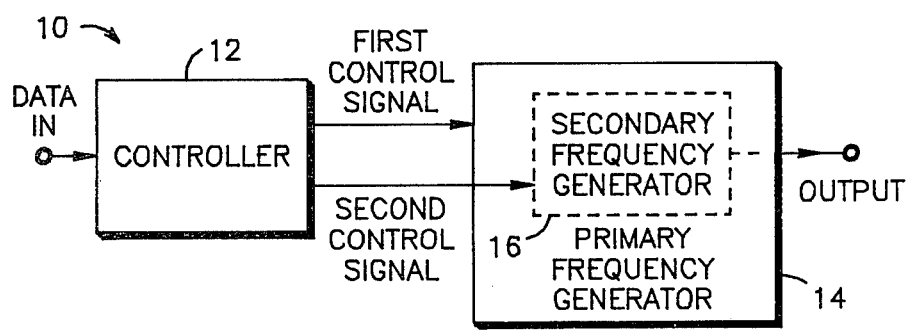
*FIG. 3*

COMMUNICATION SYSTEM HAVING IMPROVED DIFFERENTIAL PHASE SHIFT KEYING MODULATION

TECHNICAL FIELD

This invention relates generally to digital communication systems and, more particularly, to a communication system using conventional differential phase shift keying (DPSK) or frequency shift keying (FSK) modulation.

BACKGROUND ART

Typically, telephone data transmission is in a continuous mode system with conventional differential phase shift keying (DPSK) or frequency shift keying (FSK) modulation over a 2-wire cable pair. Other techniques for achieving full duplex bidirectional transmission which have advantages over a continuous mode system are also known. Disadvantages of a continuous mode system in full duplex bidirectional transmission result from the separation of both streams of data. Typically, frequency separation or algebraic cancellation is used to separate the data. However, frequency separation may be complicated to implement and is both bandlimited and distance limited. Algebraic cancelling is not exact for all applications and may also create a severe echo problem from various harmonics and transmission line reflections. Therefore, a promising alternative to continuous mode operation is a time compression multiplexed (TCM) system which is also known as a burst mode or ping-pong system. The burst mode system divides the two directions of transmission by separating them in time so that at any particular point in time, transmission is unidirectional. The penalty which results from using the burst mode system is a substantially higher frequency of transmission since data must be bursted at least at twice the frequency of the data entering the system to insure adequate time separation. Whenever DPSK or FSK modulation is used in a burst mode system, a very wide spectral content results. A further disadvantage results for FSK modulation because D.C. balance is usually not maintained for each burst of data and an extra bit is required to maintain D.C. balance. When a digital burst mode transmission is not D.C. balanced bit by bit, inter-symbol interference results and may destroy the meaning of the transmitted data. Whenever phase modulation is used, D.C. balance is maintained, but harmonic energy may radiate into other communication channels.

SUMMARY OF THE INVENTION

Accordingly, an object of the present invention is to provide an improved communication system.

Another object of the present invention is to provide an improved communication system capable of operating in burst mode operation with a low spectral content.

A further object of the present invention is to provide an improved communication system utilizing a hybrid DPSK modulation for burst mode operation.

Yet another object of the present invention is to provide an improved communication system utilizing a hybrid DPSK modulated signal which is D.C. balanced in a burst mode system and has substantially reduced harmonic energy.

In carrying out the above and other objects and advantages of the present invention, there is provided, in one form, control means which receive serial digital data having a first frequency. The control means provide either a first control signal in response to each received digital datum having a first predetermined value or a second control signal in response to the digital datum having a second predetermined value. Another form of the invention may use only one control signal which has either a first or a second value depending upon the value of the digital datum. Coupled to the control means and in parallel with each other are frequency generator means. A first frequency generator provides a full cycle of an output signal at the first frequency every time the first control signal is received. A second frequency generator provides a half cycle of the output signal at a second frequency which is one-half the first frequency and in phase with the preceding half cycle of the output signal every time the second control signal is received. Although the communication system may operate in a continuous mode operation, a burst mode operation may also be used. In burst mode operation, the control means provide a start control signal at the beginning of a new burst which provides a half cycle of the output signal which is at the first frequency and which is phase encoded with respect to the last data bit of the preceding burst. The control means also provide a stop signal at the end of a burst to provide a half cycle of the output signal which is at the first frequency and of opposite polarity to the immediately preceding half cycle.

The above and other objects, features and advantages of the present invention will be more clearly understood from the following detailed description taken in conjunction with the accompanying drawings.

BRIEF DESCRIPTION OF THE DRAWINGS

FIG. 1 illustrates in graphic form an example of a DPSK modulated signal known in the prior art;

FIG. 2 illustrates in graphic form an example of an FSK modulated signal known in the prior art;

FIG. 3 illustrates in block diagram form a communication system illustrating the preferred embodiment of the present invention;

DESCRIPTION OF THE PREFERRED EMBODIMENT

Figure 4:
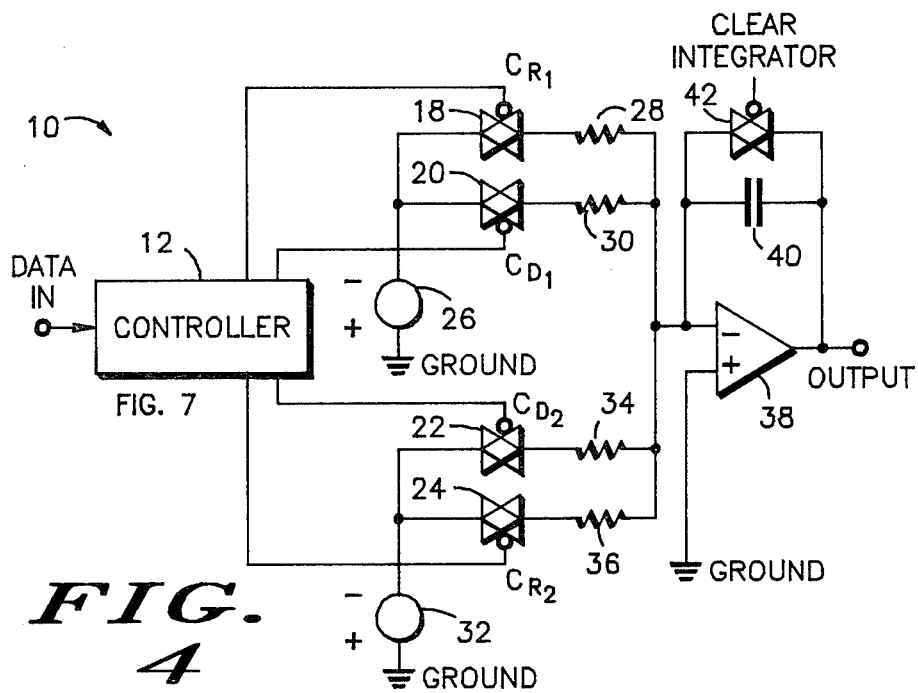
FIG. 4 illustrates in schematic and block diagram form a communication system constructed in accordance with the preferred embodiment of the present invention.

Shown in FIG. 1 is an example of conventional differential phase shift keyed modulated (DPSK) utilized in high speed digital data transmission over standard 2-wire telephone wire. The example shown is that of a digital byte represented as "1101". The frequency of the DPSK signal is that of the carrier frequency of the transmitted data. Assume only for the purpose of illustration that a logic "1" is represented by no change in phase from the preceding cycle. Therefore a logic "0"

would be represented by a change in phase from the preceding cycle such as a 180 degree phase shift. A typical data transmission frequency for an input carrier signal operating in a burst mode system is 256 kHz. Unfortunately, the 180 degree phase shift in conventional DPSK produces a large amount of second harmonic energy which is never utilized for the demodulation process. Additionally, the second harmonic energy may radiate into other communications channels and cause interference. To eliminate the problem, the second harmonic would have to be filtered before transmission. Because the phase information is carried at a high frequency, the information is rapidly attenuated by the inherent lowpass characteristic of the transmission media and is more vulnerable to noise disruptions.

Shown in FIG. 2 is an example of conventional frequency shift keyed modulation (FSK) utilized in high speed digital data transmission over standard 2-wire telephone wire. The example shown is for an identical digital byte of "1101". Assume only for the purpose of illustration that a logic "1" indicates a first predetermined frequency. Therefore a logic "0" would indicate a second predetermined frequency. A disadvantage of FSK modulation is that there is a likelihood of losing D.C. balance. Due to the characteristics of a twisted pair of wire, it is necessary that the wire be D.C. balanced to prevent bias distortion and inter-symbol interference. Unfortunately, a D.C. bias may exist after a byte transmission such as the one illustrated in FIG. 2. For cycles 1, 2 and 4 there is only a D.C. signal, the sum of which is not balanced. Although cycle 3 is D.C. balanced, there is no D.C. balance of the entire signal bit by bit. To prevent having a large D.C. bias on the transmission line, a D.C. balancing bit must be inserted during the byte burst to balance the D.C. bias for the entire burst. A disadvantage with using a balancing bit is the loss of time required to transmit the balancing bit and a resulting distance limitation.

Shown in FIG. 3 is a block diagram of a communication system 10 comprising a controller 12 for providing first and second control signals to a primary frequency generator 14 and to a secondary frequency generator 16, respectively. Communication system 10 is a transmission system capable of operating either in a continuous mode or in a burst mode operation. Communication system 10 utilizes an improved and hybrid differential phase shift keying modulation having substantial advantages over conventional DPSK and FSK modulation.

Shown in FIG. 4 is communication system 10 constructed in accordance with the preferred embodiment of the present invention. Controller 12 of communication system 10 is coupled to the control inputs of transmission gates 18, 20, 22 and 24. In the preferred form, transmission gates 18, 20, 22 and 24 are conventional MOS transmission gates clocked in a conventional manner by control signals $C_{R1}$, $C_{R2}$, $C_{D1}$ and $C_{D2}$ which control the rate and direction of polarity of the output signal, respectively. An embodiment of controller 12 is shown in greater detail in FIG. 7. Although in the preferred form controller 12 is shown as supplying two control signals, the present invention may also be practiced with a controller providing only a single control signal which controls the rate of the output signal. When a single control signal is utilized, no phase change occurs when the rate change occurs. Transmission gates 18 and 20 each have an input connected together and coupled to a positive potential terminal of a voltage source 26. A negative potential terminal of voltage source 26 is coupled to a reference voltage such as ground. An output of transmission gate 18 is connected to a first terminal of a resistor 28, and an output of transmission gate 20 is connected to a first terminal of a resistor 30. Transmission gates 22 and 24 each have an input connected together and coupled to a negative potential terminal of a voltage source 32. A positive potential terminal of voltage source 32 is coupled to the reference or ground voltage. An output of transmission gate 22 is connected to a first terminal of a resistor 34, and an output of transmission gate 24 is connected to a first terminal of a resistor 36. Resistors 28, 30, 34 and 36 each hve a second terminal connected together and coupled to an inverting input of an operational amplifier 38. A noninverting input of operational amplifier 38 is coupled to the reference or ground voltage. A feedback capacitor 40 has a first plate coupled to the inverting input of operational amplifier 38 and a second plate coupled to an output of operational amplifier 38. Coupled in parallel with feedback capacitor 40 is a transmission gate 42 having an input coupled to the first plate of feedback capacitor 40 and an output coupled to both the second plate of feedback capacitor 40 and the output of operational amplifier 38. Coupled to transmission gate 42 is a clear integrator control signal shown in FIG. 8 which zeroes the charge on feedback capacitor 40 between bursts of data. Transmission gate 42 is not needed for a continuous mode operation.

Figure 5:
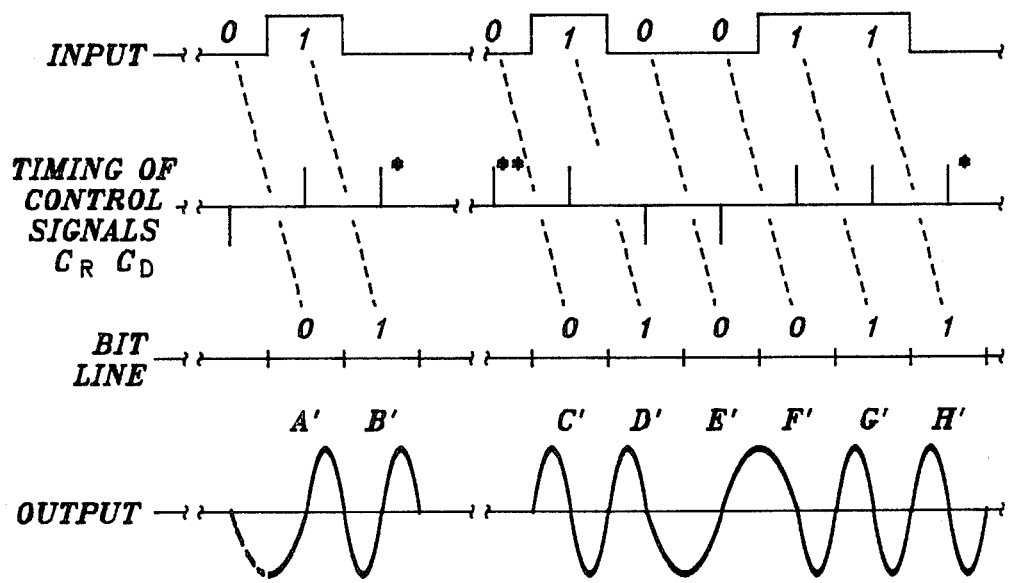
FIG. 5 illustrates in graphical form signals associated with the communication system of FIG. 4.

In operation, the signals shown in FIG. 5 illustrate how communication system 10 provides a hybrid DPSK modulated signal. Assume for the purposes of illustration that a data transmission is in progress. Both the input data and output signal have distinct bit periods. Control signals $C_{R1}$, $C_{R2}$, $C_{D1}$ and $C_{D2}$ are generated during a control period which corresponds to a respective one of said bit periods but preceding the bit period by at least one-half of a bit period. In a preferred embodiment, control signals $C_{R1}$ and $C_{R2}$ are generated at the half cycle boundary of the bit periods and $C_{D1}$ and $C_{D2}$ may be generated at the one-fourth, one-half and three-fourth cycle boundaries in order to generate the triangle approximation. When only one control signal is used as previously mentioned, that one control signal controls the rate of the output signal and the phase or direction of the output signal is automatically fixed by controller 12 to never change at a half cycle boundary. At the initial point of observation, a digital "0" is being received at the input of controller 12. Assume also that controller 12 is programmed so that when a "0" is received during a control period, the output signal is frequency shifted to one-half the frequency of the input carrier at the half cycle boundary of the output signal. The output signal is not frequency shifted at the half cycle boundary of the preceding bit period when a "1" is received by controller 12 but remains at the input carrier frequency. Thus, the improved and hybrid DPSK modulation is actually a frequency modulation of a phase encoded signal. In order to provide control signals $C_{R1}$, $C_{R2}$, $C_{D1}$ and $C_{D2}$ which provide the information as to whether to change frequency or not, the serial digital data must be received by controller 12 at least one-half of a bit period earlier. In the example shown, during a bit period of the output signal labeled A', the output signal shown had a frequency change to one-half of the input carrier frequency. It should be noted that the "0" for bit period A' was received at least by the middle of the preceding bit period. At least by the middle of bit period A' the input "1" for bit period B' is received. By the middle of bit period A', controller 12 generates control signals $C_{R1}$, $C_{R2}$, $C_{D1}$ and $C_{D2}$ which are necessary to frequency shift the output signal for bit period B' back to the frequency of the input carrier. By the middle of bit period B', no input signal has been received and controller 12 generates a stop signal denoted by a single asterisk in FIG. 5 which indicates that a single half cycle at the carrier frequency of 256 KHz and of opposite polarity to the first half cycle of bit period B' should be generated during the last half cycle of bit period B'. This is the end of a burst of signal energy and no data is present on the line for some finite time. Between bursts, transmission gate 42 is closed by the clear integrator control signal and all charge on capacitor 40 is zeroed and the voltage at the output of operational amplifier 38 is held at the reference or ground voltage.

When another burst of signal energy is received, controller 12 generates a start signal denoted by a double asterisk in FIG. 5 which generates an output signal for only the first half of bit period C'. The initial half cycle of the input signal for a new burst will have the same frequency as the frequency of the last half bit period of the preceding burst which is the primary frequency. Controller 12 is programmed so that for the first half cycle, an initial "0" provides a half cycle of output signal which is out of phase with the last cycle of the preceding burst and an initial "1" provides a half cycle of output signal which is in phase with the last cycle of the preceding burst. Since a "0" is initially received, the first half of bit period C' is opposite in phase to the output signal of the last bit period which was B'. By the middle of bit period C', the input bit for the following bit D' must be received and control signals $C_{R1}$, $C_{R2}$, $C_{D1}$ and $C_{D2}$ generated in response. A "1" for bit period D' is received and therefore the output signal is not frequency shifted at the half cycle boundary of bit period C'. By the middle of bit period D', the input bit for the following bit E' must be received and control signals $C_{R1}$, $C_{R2}$, $C_{D1}$ and $C_{D2}$ generated in response. A "0" for bit period E' is received and therefore an output signal exhibiting a change in frequency to one-half the carrier frequency is generated during the last half of bit period D' and the first half of bit period E'. By the middle of bit period E', the input bit for the following bit period F' must be received and control signals $C_{R1}$, $C_{R2}$, $C_{D1}$ and $C_{D2}$ generated in response. A "0" for bit period F' is received and therefore an output signal exhibiting a frequency of one-half the frequency of the input carrier is generated during the last half of bit boundary E' and the first half of bit period F'. Thus, the frequency of the output signal remains the same from the half cycle boundary of bit period D' to the half cycle boundary of bit period F'. By the middle of bit period F', the input bit for the following bit period G' must be received and control signals $C_{R1}$, $C_{R2}$, $C_{D1}$ and $C_{D2}$ generated therefor. A "1" for bit period G' is received and therefore an output signal exhibiting a frequency equal to the input carrier is generated from the half cycle boundary of bit period F' until the half cycle boundary of bit period G'. By the middle of bit period G', the input bit for bit period H' must be received and control signals $C_{R1}$, $C_{R2}$, $C_{D1}$ and $C_{D2}$ generated in response. A "1" for bit period H' is received and therefore an output signal exhibiting a frequency equal to the input carrier is again generated and is provided from the half cycle boundary of bit period G' until the half cycle boundary of bit period H'.

By the middle of bit period H', no further bits to the input signal are received and controller 12 generates a stop signal denoted by a single asterisk as previously explained for the end of the previous burst. The control signal denoted by s single asterisk generates a single half cycle signal during the last half of bit period H'. The single half cycle signal is of opposite polarity from the first half of bit period H' of the output signal. The frequency of the last half cycle of bit period H' is the input carrier or primary frequency. This is the end of another burst and no further output signal is generated until another burst is received.

Figure 6:
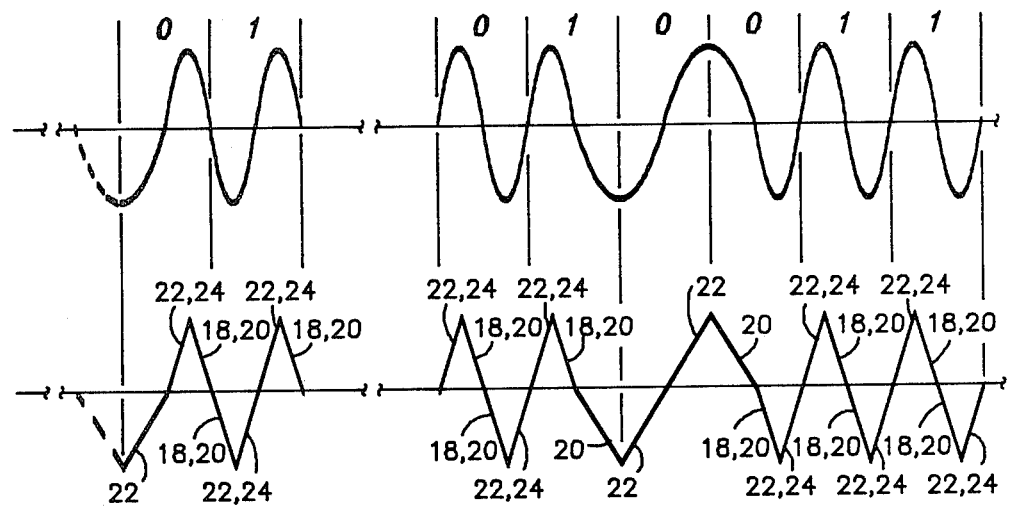
FIG. 6 illustrates in graphical form a triangular approximation of the output signal shown in FIG. 5.

Shown in FIG. 6 is the output signal corresponding to the example illustrated in FIG. 5 and a triangular waveform approximation of the output signal. The transmission gates which are required to be closed to produce the triangular waveforms of varying slope are designated in FIG. 6.

Figure 7:
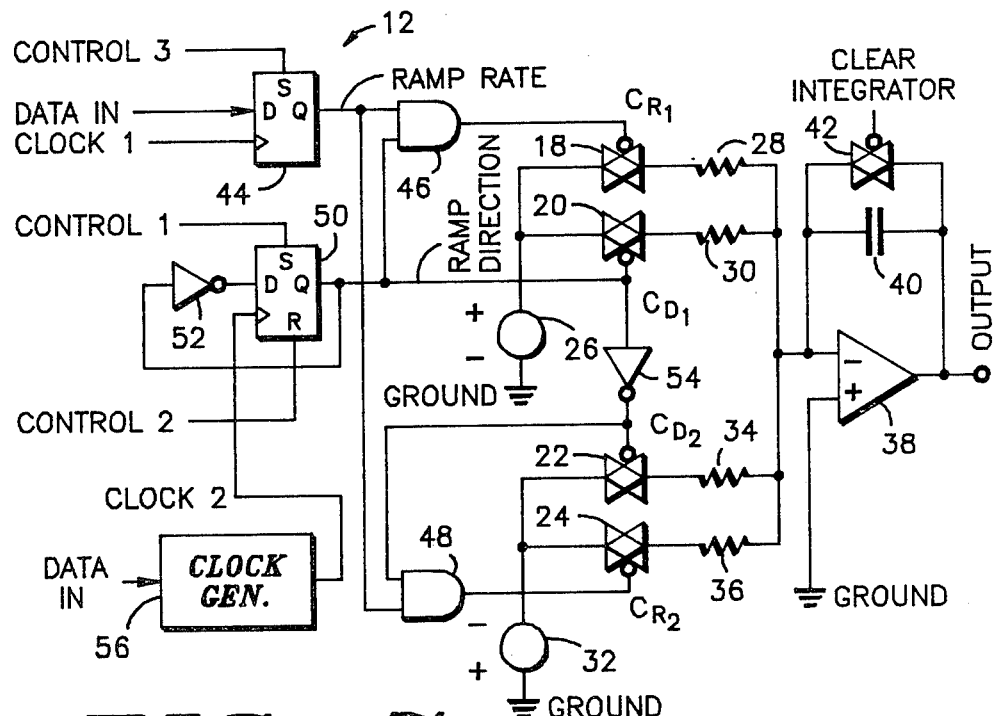
FIG. 7 illustrates in schematic form an example of a controller which produces the triangular approximation shown in FIG. 6 and which is used with the communication system of FIGS. 3 and 4.

FIG. 7 illustrates communication system 10 with controller 12 in greater detail and which may be easily implemented by conventional logic to provide triangular ramp rate and direction control signals which will control transmission gates 18, 20, 22 and 24 to provide the output signal shown in FIG. 6. Controller 12 comprises a D-type flip-flop 44 having the D input thereof coupled to the input serial data, a clock input coupled to a clock 1 signal and the S input thereof coupled to a control 3 signal. A Q output of flip-flop 44 provides the ram rate control and is coupled to a first input of AND gates 46 and 48. A D-type flip-flop 50 has the S input thereof coupled to a control 1 signal and the reset input thereof coupled to a control 2 signal. An inverter 52 has an input coupled to a Q output of flip-flop 50 and an output coupled to a D input of flip-flop 50. The Q output of flip-flop 50 provides the ramp direction control and is coupled to a second input of AND gate 46, to the control input of transmission gate 20 and to the input of an inverter 54. An output of inverter 54 is coupled to both a second input of AND gate 48 and to the control input of transmission gate 22. A clock generator 56 has an input coupled to the input serial data and an output for providing a clock 2 signal to the clock input of flip-flop 50.

In this configuration, gates 18, 20, 22 and 24 are switched to function as a primary frequency generator to generate a full cycle of the output signal at the primary frequency of 256 KHz. By selectively opening gates 18 and 24 in response to the input data, a secondary frequency which is one-half the primary frequency and in phase with the primary frequency is provides. Operational amplifier 38 and integrating capacitor 40 function as an integrator to provide the triangular waveform of FIG. 6 by integrating the current which is summed into the noninverting or negative input of operational amplifier 38. Although in the preferred form resistors 28, 30, 34 and 36 are used, impedances may be freely substituted to accomplish the same function.

Figure 8:
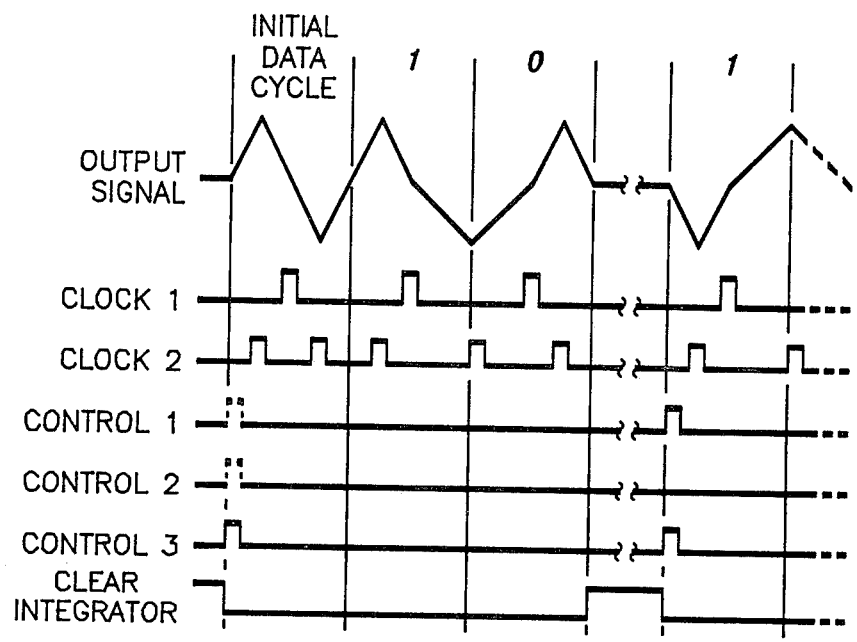
FIG. 8 illustrates in graphical form signals associated with the controller shown in FIG. 7.

Shown in FIG. 8 are signals associated with the operation of controller 12. An initial burst of data is shown. At the beginning of a burst a control 3 signal will be generated. Either a control 1 or a control 2 signal will be generated depending upon the following Boolean algebra equations:

Control $1 = [D_I \cdot P + \overline{D_I} \cdot \overline{P}] \cdot$ control 3

Control $2 = [D_I \cdot \overline{P} + \overline{D_I} \cdot P] \cdot$ Control 3 where
- $D_I$ = the Boolean value (either a logic "1" or logic "0") that the initial cycle of a burst is to represent; and
- P = a Boolean variable such that P=1 if the polarity of the last half of the last cycle of the previous burst was positive and P=0 if the polarity of the last half of the last cycle of the previous burst was negative.

Clock generator 56 provides a clock 2 signal which varies as shown in FIG. 8 depending upon the logic state of the input data. A clock 1 signal is generated at every half cycle boundary. The ramp rate and ramp direction signals therefore control transmission gates 18, 20, 22 and 24 to provide the output signal.

The hydrid DPSK modulated output signal has a lower amount of second harmonic energy than a corresponding output signal produced by conventional DPSK modulation. Since the modified DPSK signal has the phase information carried at a lower frequency, a stronger receivable signal is provided than the corresponding signal produced by conventional DPSK modulation. By now it should also be apparent that a modulated output signal of a selected primary frequency having a zero direct current component bit by bit has been provided. The output signal may be decoded by conventional DPSK modulation techniques and the demodulation process has remained unchanged. This modification of conventional differential phase shift keyed modulation may be used for high speed digital data transmission over standard telephone wire in either a continuous mode or a burst mode operation. When continuous mode operation exists, controller 12 operates in the same manner as in the preceding illustration except the control signals denoted by a single and double asterisk are never generated.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the true spirit and scope of the invention.

We claim:

1. A communication system for generating an output signal of a selected primary frequency and having a plurality of bursts of digital data bits serially modulated thereon at said primary frequency during respective predetermined bit periods in order to provide differential phase encoding of an input signal while frequency modulating the output signal, comprising:

first control means for receiving the serial digital data bits and providing a start control signal and for providing a stop control signal in response to the failure to receive a digital data bit within the first half of any of the bit periods;

second control means for providing, during a control period corresponding to a respective one of said bit periods but preceding said one bit period by at least one-half said one bit period, a data control signal for each control period in response to each received digital datum having a first predetermined value or no data control signal in response to each received digital datum having a second predetermined value; and frequency generator means coupled to the control means, for generating a half cycle of the output signal having the same frequency as a last half bit of an immediately preceding burst of data bits in response to the start control signal, for generating a full cycle of said output signal at said primary frequency and in phase with the preceding half cycle of said output signal in response to the presence of each of said data control signals, for generating a half cycle of said output signal at a secondary frequency one-half said primary frequency and in phase with the preceding half cycle of said output signal in response to the absence of a data control signal during a control period, and for generating a stop control signal in response to the failure to receive a digital datum within a first half of any of the bit periods, wherein the output signal has a zero direct current component bit by bit.

2. A communication system for generating an output signal of a selected primary frequency having digital data bits serially modulated thereon at said primary frequency during respective predetermined bit periods, comprising:

control means for receiving the serial digital data bits, and providing, during a control period corresponding to a respective one of said bit periods but preceding said one bit period by one-half said one bit period, a primary control signal in response to each received digital datum having a first predetermined value and a secondary control signal in response to each received digital datum having a second predetermined value;

primary frequency generator means for generating a full cycle of said output signal at said primary frequency and in phase with the preceding half cycle of said output signal in response to each of said primary control signals, comprising:

first switching means having first and second terminals, and a control terminal coupled to said control means;

first impedance means having a first terminal coupled to the second terminal of said first switching means, and a second terminal;

first supply means having a first terminal of first polarity type coupled to the first terminal of said first switching means, and a second terminal of second polarity type coupled to a reference voltage;

second switching means having first and second terminals, and a control terminal coupled to said control means;

said impedance means having a first terminal coupled to the second terminal of said second switching means, and a second terminal coupled to the second terminal of said first impedance means; and second supply means having a first terminal of said second polarity type coupled to the first terminal of said second switching means, and a second terminal of said first polarity type coupled to said reference voltage; and secondary frequency generator means coupled to the control means, for generating a half cycle of said output signal at a secondary frequency one-half said primary frequency and in phase with the preceding half cycle of said output signal in response to each of said secondary control signals.

3. The communication system of claim 2 wherein said secondary frequency generator means further comprise:

third switching means having a first terminal coupled to the first terminal of said first polarity type of said first supply means, a control terminal coupled to said control means, and a second terminal;

third impedance means having a first terminal coupled to the second terminal of said third switching means, and a second terminal coupled to the second terminal of said first and second impedance means;

fourth switching means having a first terminal coupled to the first terminal of said second polarity type of said second supply means, a control terminal coupled to said control means, and a second terminal; and fourth impedance means having a first terminal coupled to the second terminal of said fourth switching means, and a second terminal coupled to the second terminal of said first, second and third impedance means.

4. The communication system of claim 3 wherein said first, second, third and fourth switching means are MOS transmission gates.

5. A communication system for generating an output signal of selected primary frequency having serial digital data with respective predetermined bit periods time compression multiplexed in a burst transmission at said primary frequency, comprising:

control means for receiving the serial digital data, and for providing, during a control period corresponding to a respective one of said bit periods but preceding said one bit period by one-half said one bit period and in response to the receipt of a burst of serial data, a start control signal for generating an output signal during a first half of a first bit period in the burst transmission, said output signal having a phase dependent upon both the phase of a preceding half cycle of an output signal and a first digital datum of the digital data, for providing a primary control signal in response to each received digital datum having a first predetermined value, for providing a secondary control signal in response to each received digital datum having a second predetermined value, and for providing a stop control signal in response to the failure to receive a digital datum within the first half of any of said bit periods for generating an output signal for a second half of a last bit period in the burst transmission;

primary frequency generator means coupled to the control means, for generating a full cycle of said output signal at said primary frequency and in phase with the preceding half cycle of said output signal in response to each of said primary control signals; and secondary frequency generator means coupled to the control means, for generating a half cycle of said output signal at a secondary frequency substantially one-half of said primary frequency and in phase with the preceding half cycle of said output signal in response to each of said secondary control signals.

6. The communication system of claim 5 wherein the output signal generated in response to said start control signal has a frequency substantially equal to the primary frequency.

7. The communication system of claim 6 wherein the output signal generated in response to said stop control signal has a frequency substantially equal to the primary frequency and is of opposite polarity to the immediately preceding half cycle of said output signal.

8. A method of providing an output signal having a phase encoded input signal comprising a burst of data bits frequency modulated thereon, comprising the steps of:

receiving a burst of serial digitized input data having a primary frequency;

providing, in response to the receipt of a first bit of the input data, a start control signal;

generating, in response to the start control signal, a half cycle of the output signal at substantially the primary frequency and having a phase determined by both a last half cycle of a preceding burst of digital data and a first digital datum of said input data;

providing, during a control period corresponding to a respective digital bit period by one-half of the bit period, a primary control signal in response to each received digital datum having a first predetermined value and a secondary control signal in response to each of the primary control signals;

generating a full cycle of said output signal at the primary frequency in phase with the preceding cycle of the output signal in response to each of the primary control signals;

generating a half cycle of said output signal at a secondary frequency one-half said primary frequency and in phase with the preceding half cycle of said output signal in response to each secondary control signal;

providing, in response to the absence of a digital data bit within a predetermined amount of time, a stop control signal; and generating, in response to the stop control signal, a last half cycle of the output signal at the primary frequency and in phase with the immediately preceding half cycle of the output signal.

9. A communication system having improved differential phase shift keying modulation, comprising:

control means for providing a plurality of control signals in response to a burst of digitized data, the control signals being delayed by half a time period from the digitized data and comprising:

a start control signal for generating a half cycle of an output signal having a frequency equal to a last half bit of an immediately preceding burst of digitized data;

a data control signal of first polarity for effecting generation of a full cycle of the output signal at a primary frequency and in phase with the immediately preceding half cycle of the output signal;

a data control signal of second polarity for effecting generation of a full cycle of the output signal at a secondary frequency which is one-half of said primary frequency and in phase with the immediately preceding half cycle of the output signal;

a first polarity voltage source; first and second switching means coupled to the first polarity voltage source;

first and second impedances coupled from the first and second switching means respectively to a common node;

a second polarity voltage source; third and fourth switching means coupled to the second polarity voltage source; and third and fourth impedances coupled from the third and fourth switching means respectively to the common node, wherein the first, second, third and fourth switching means each are coupled to the control means and are each controlled by a predetermined one of the control signals.

* * * * *